J. C. BARCLAY.
TELEGRAPH TRANSMITTER.
APPLICATION FILED MAR. 22, 1909.

976,537.

Patented Nov. 22, 1910.

5 SHEETS—SHEET 1.

Witnesses:
Max B. A. Doring.
Paul H. Frank

Inventor
John C. Barclay
By his Attorney

J. C. BARCLAY.
TELEGRAPH TRANSMITTER.
APPLICATION FILED MAR. 22, 1909.

976,537.

Patented Nov. 22, 1910.
5 SHEETS—SHEET 4.

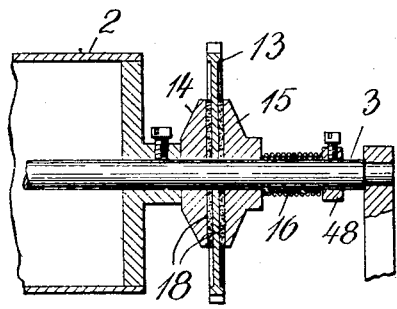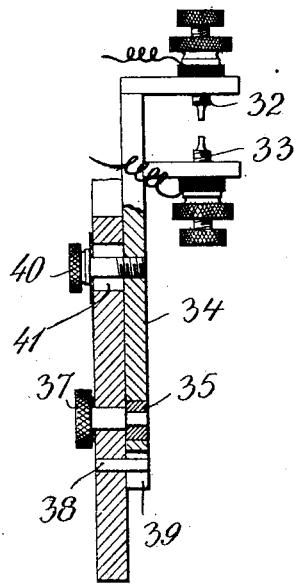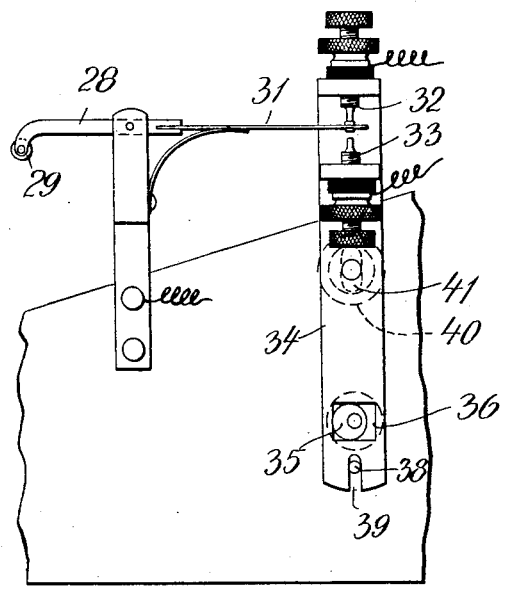

UNITED STATES PATENT OFFICE.

JOHN C. BARCLAY, OF MONTCLAIR, NEW JERSEY.

TELEGRAPH-TRANSMITTER.

976,537.  Specification of Letters Patent.  Patented Nov. 22, 1910.

Application filed March 22, 1909. Serial No. 484,976.

*To all whom it may concern:*

Be it known that I, JOHN C. BARCLAY, a citizen of the United States, residing at Montclair, in the county of Essex and State of New Jersey, have invented certain new and useful Improvements in Telegraph-Transmitters, of which the following is a specification.

My invention relates to improvements in keyboard telegraph transmitters, and particularly to transmitters adapted for use in synchronous telegraph systems, such, for example, as "ticker" systems, and comprises, in combination with a rotary drum and a keyboard the several keys of which are each adapted to arrest said drum in a position different from that in which said drum may be arrested by any other of said keys, of improved means for operating a line circuit; also in an improved arrangement of the parts, and various other features hereinafter described and particularly pointed out in the appended claims.

The object of my invention is to improve the construction of telegraph transmitters, and particularly of transmitters of the type referred to, and to make the transmitter simple, relatively inexpensive, durable, rapid, and easy to operate.

I will now proceed to describe my invention with reference to the accompanying drawings, in which one construction of transmitter embodying my invention is illustrated, and will then point out the novel features in claims.

Figure 1:
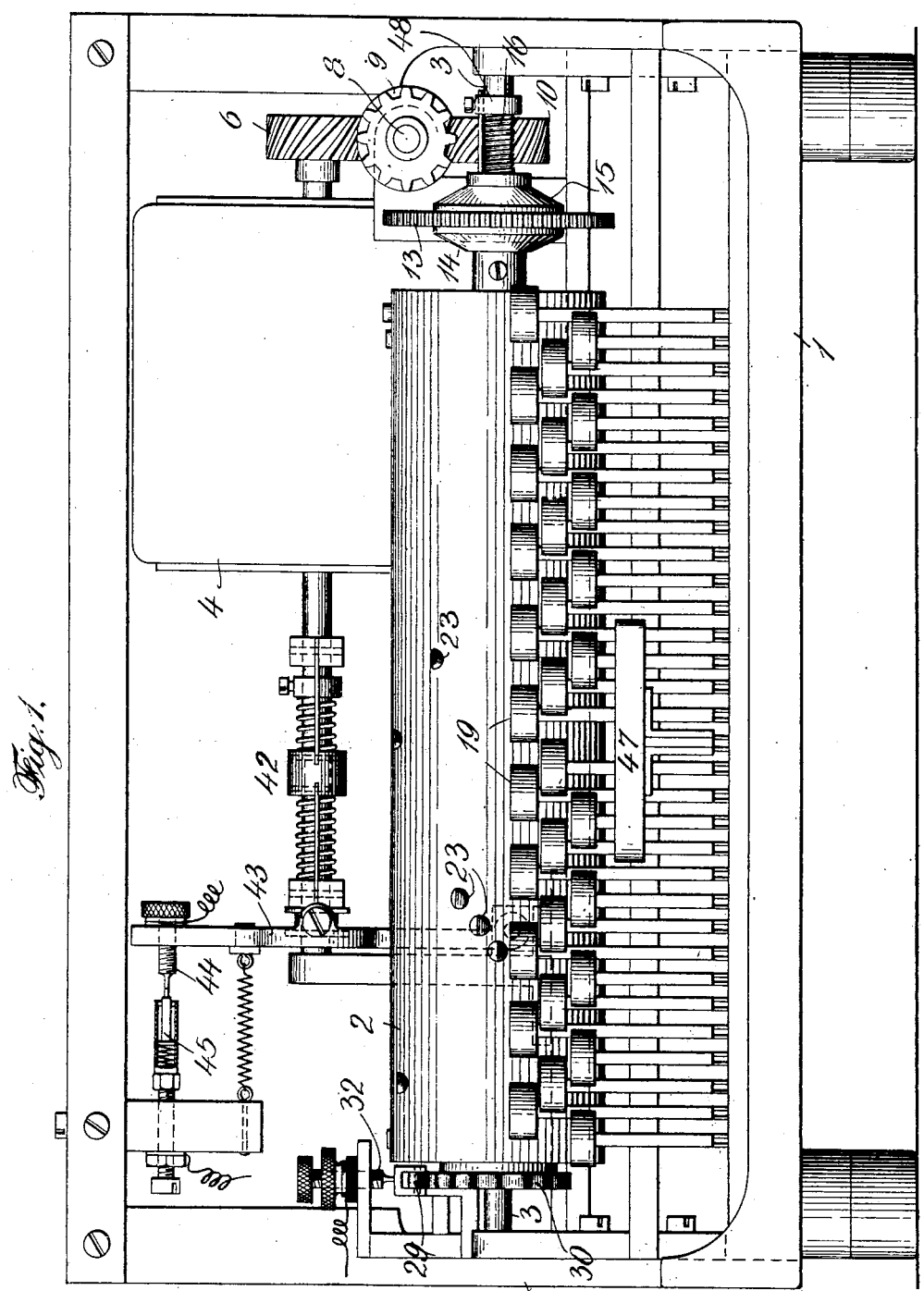
Figure 2:
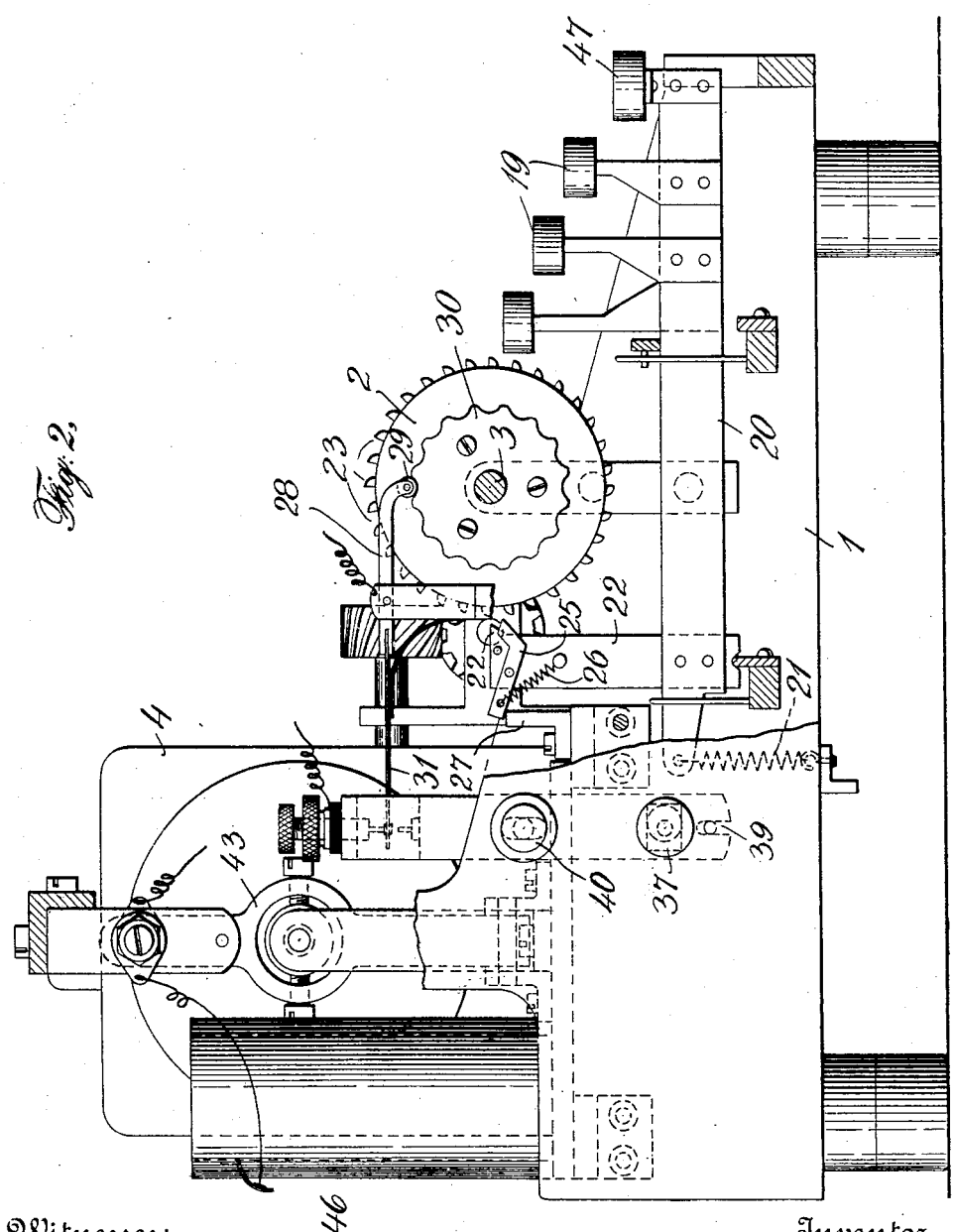
Figure 3:
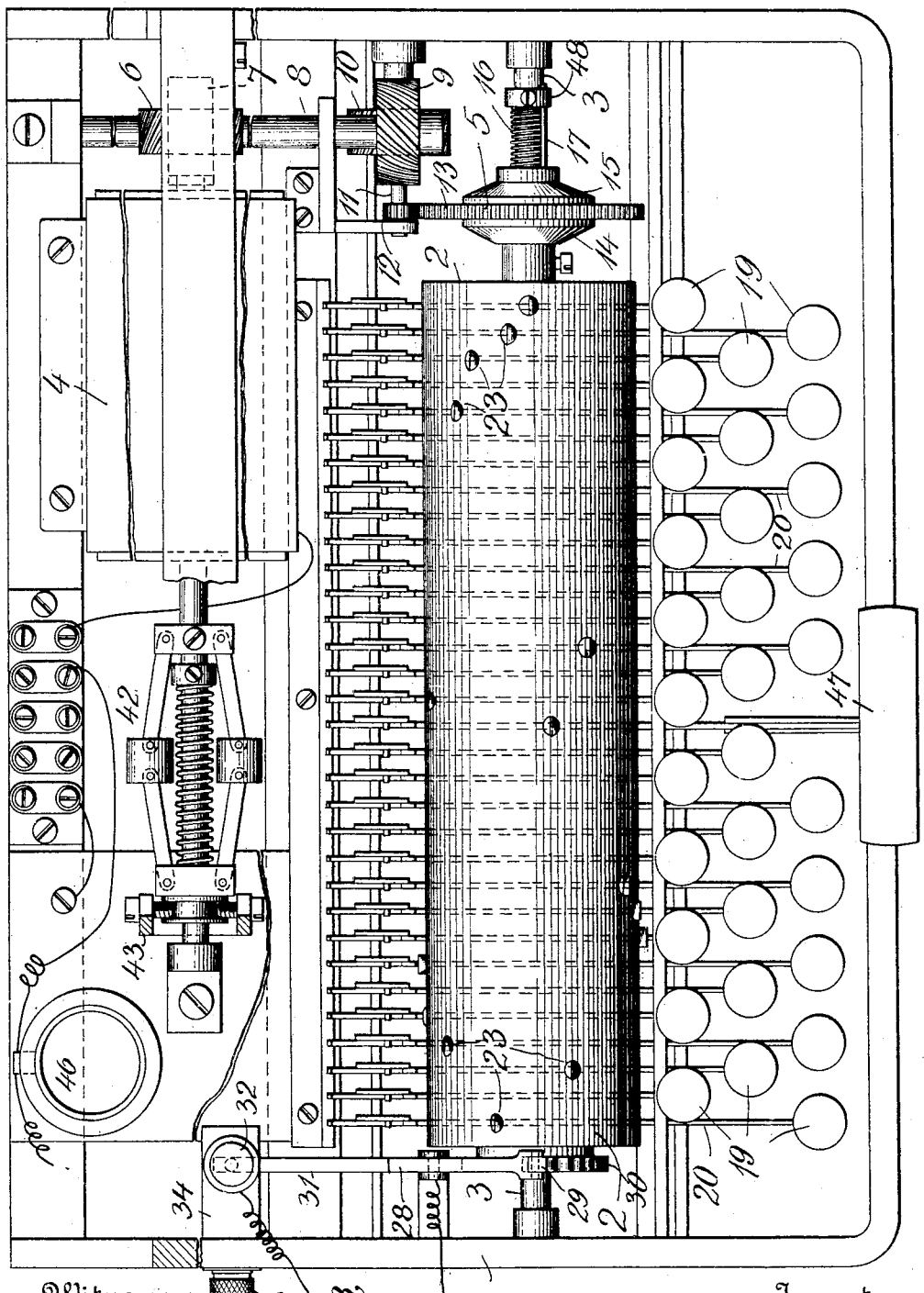
Figure 4:
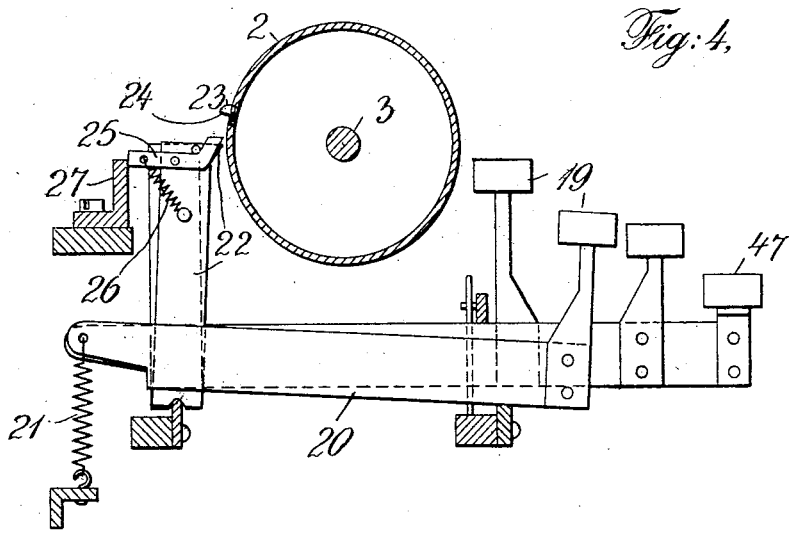
Figure 5:
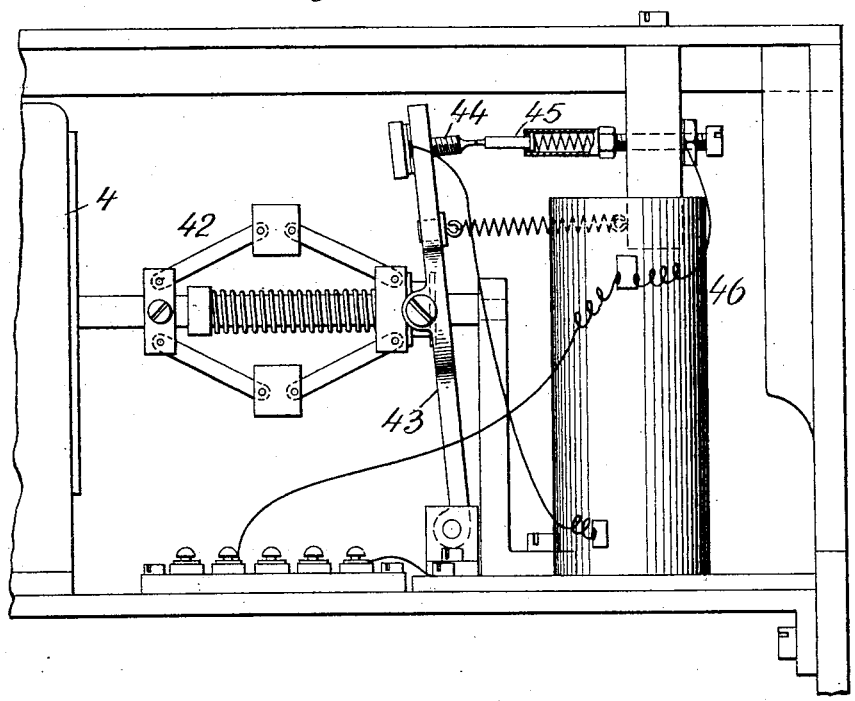

In said drawings: Figure 1 shows a front elevation of the transmitter; Fig. 2 shows a side elevation and partial section of the transmitter; Fig. 3 shows a top view and partial section of the transmitter, a portion of the top frame bar being broken away and parts of the transmitter being shown in section; Fig. 4 shows a detail side view and partial section of the drum, finger keys, and associated parts; Fig. 5 shows an elevation, from the rear of the machine, of the speed-regulating mechanism of the transmitter; Fig. 6 shows a longitudinal section of the friction driving device of the drum, and associated parts; Fig. 7 shows a detail front view and partial section of the adjustable contact-stop carrier and associated parts, and Fig. 8 shows a side elevation of the same parts and of the vibrator, looking from the right-hand side of the machine.

In the drawings, 1 designates a suitable frame, and 2 a drum mounted upon a shaft 3, itself mounted in suitable bearings in frame 1.

4 designates a driving motor (an electric motor, in the instance shown) arranged to drive drum 2 through suitable reducing gearing, and through a friction driving device, 5. Said reducing gearing comprises, in the instance shown, spiral gears 6 and 7, a countershaft 8, spiral gears 9 and 10, another shaft 11, and a pinion 12 thereon in mesh with the gear 13 of the friction driving device 5. Said friction driving device comprises (see Fig. 6) two disks, 14 and 15, on opposite sides of gear 13, a spiral spring 16 tending to press said disks against said gear, and a pin 17 carried by disk 15 and arranged to slide through a collar 48 fast on shaft 3; said pin constituting the equivalent of a key to connect disk 15 with shaft 3. Disks 14 and 15 have wearing faces of suitable friction material, 18. It will be clear that as gear 13 is rotated, drum 2 will be rotated by friction of said gear against disks 14 and 15, motion being transmitted through shaft 3 to drum 2.

In front of drum 2 is a keyboard comprising a plurality of finger keys 19 (which in practice customarily bear designations corresponding to the various characters to be transmitted) mounted on suitable pivoted key-levers 20 provided with suitable springs 21 which normally hold said keys elevated. These key-levers 20 are provided with bell-crank extensions, 22, adapted, when one of said key-levers is depressed, to move into the path of a corresponding one of a series of pins, 23, projecting radially from the surface of drum 2. It will be clear that when one of the finger keys is depressed, and held down, its corresponding bell-crank extension, 22, will engage the corresponding drum-pin 23 when, in the rotation of said drum, such pin reaches said bell-crank extension, and that thereby the drum will be arrested; gear 13 nevertheless continuing to revolve.

As shown particularly in Fig. 4, the pins 23 are short studs screwed into corresponding holes in the drum and stepped so as to provide a flat surface 24 for engagement with the corresponding key lever, the rear side of the projecting portion of each pin being rounded so as to clear the corresponding key lever quickly as soon as said key lever is withdrawn out of the path of such pin and drum 2 is permitted to begin rotation again.

Most former transmitters of this type have had an exaggerated "legato" touch, it being necessary for the operator, after depressing one key, to hold it down until that key has arrested the drum. This extreme legato touch is somewhat difficult to learn, and it is desirable that the machine shall have a touch corresponding closely to the touch of an ordinary typewriter. To this end I have provided automatic means for holding down each key-lever when depressed, until the drum 2 has been arrested. Such automatic means comprises a latch, 25, for each key-lever, mounted on the bell-crank extension 22 thereof; a spring 26 for each latch, tending to draw the latch into the position shown in Fig. 4; and a single transverse bar, 27, which, when the finger keys are all up, engages all of the latchess and holds them in the position shown in Fig. 2. When one of the finger keys is depressed, as its bell-crank extension 22 moves forward it draws the corresponding latch 25 away from the transverse bar 27, the spring 26 then drawing said latch into the position shown in Fig. 4, in which position the latch, by engagement with the front of transverse bar 27, prevents rise of the finger key. The front end of the latch is arranged to be engaged by the corresponding drum-pin 23 before said pin encounters the extension 22 of the corresponding key-lever; and when said pin 23 does engage the latch 25, it depresses its front end, lifting the rear end of the latch clear of the transverse bar 27, and so permitting the finger key to rise. The brief pause in the rotation of drum 2, produced by momentary engagement of the drum-pin 23 with latch 25 and extension 22 is sufficient, however, to produce the slight prolongation of pulse required to be produced by this class of transmitters.

Rotation of drum 2 causes the operation of current-reversing means whereby as the drum rotates reversals of current in a line circuit are produced continuously. To this end, a pivoted vibrator, 28, is provided, one end of this vibrator carrying an anti-friction roller, 29, arranged to be actuated by a toothed wheel 30 secured to one end of drum 2 and rotating therewith. The other end of this vibrator 28, which is a flexible spring 31, works between contact screws 32 and 33, carried by a bracket 34, mounted to slide longitudinally along the frame of the machine. For adjusting this bracket and its contact screws, with reference to the vibrator, I provide an eccentric 35, working within an orifice 36 in said bracket, said eccentric being arranged to be rotated by means of a milled head 37; and to guide said bracket, and also to clamp it in place, when once adjusted I provide a pin 38, working within a slot 39, and a clamping and guide screw 40, working in a slot 41. The contact screws 32 and 33 are also independently adjustable, and are insulated from the bracket and so from each other.

Owing to the curved form of the teeth of wheel 30, and also owing to the fact that part of the vibrator is a flexible spring 31, during the operation of the machine contact continues between the vibrator and the contact screws for a relatively long time, as compared with ordinary pole-changers of the "walking-beam" type, which is desirable, as thereby longer intervals are provided for the rise of line potential and for the operation of the mechanism of the telegraph printers which transmitters such as herein described are intended to control. The duration of the interval during which contact continues may be adjusted by varying the distance between the screws 32 and 33. By adjusting the position of the bracket 34, vertically, the period of contact of one screw with the vibrator may be prolonged, with reference to the period of contact of the other screw with the vibrator; line conditions frequently rendering this adjustment desirable.

For controlling the speed of rotation of the drum 2 I provide a fly-ball governor, 42, on the armature shaft of the motor 4, controlling the contact lever 43, carrying a contact screw 44 adapted to make contact with a spring-pressed contact screw 45; the power circuit of the motor passing through these contact screws 44 and 45. When the desired maximum speed is exceeded, the governor retracts lever 43 so that screw 44 no longer makes contact with screw 45, so breaking the circuit of the motor so far as said screws are concerned; and as soon as the speed of the motor has dropped sufficiently, the governor causes said screws to contact again, so completing the circuit of the motor. In this way the speed of the motor may be regulated within close limits. The speed to be maintained may be varied at will by regulating the screws 44 and 45. A resistance coil 46 is shunted across screws 44 and 45, to reduce sparking at these screws and to render the operation of the motor more even; the effect of the resistance on the motor being, that when the screws 44 and 45 are separated, the motor circuit is not broken, but the resistance in said circuit is greatly increased, for which reason the speed of the motor will decrease.

In use, the transmitter is operated much the same as an ordinary typewriter. One of the keys, 47, is a space key, this key, like all of the others, being arranged to arrest the drum 2 at a particular position.

What I claim is:—

1. A telegraph transmitter comprising in combination a rotary member, means for arresting same in different angular positions, and contact means operated thereby comprising a vibrator including a resilient member and contacts between which said vibrator moves, said rotary member comprising teeth adapted to cause vibration of said vibrator, a carrier for said contacts, and means for adjusting said carrier in the direction of motion of said vibrator comprising guides for said carrier and an eccentric engaging the carrier.

2. A telegraph transmitter comprising in combination a rotary member provided with a plurality of projecting studs occupying different paths of rotation, and distributed angularly, said studs consisting of plugs screwed into said member, the external portions of said plugs being stepped on one side and beveled on the other, means for driving said member, finger keys and means operated thereby arranged to engage said projections to arrest said member, and circuit controlling means operated by said member.

3. A telegraph transmitter comprising in combination a rotary member, means for driving the same, circuit controlling means operated by said member, finger keys and means operated thereby, comprising means for holding down a finger key which has been depressed, comprising a spring-actuated trip for each such key, and stationary means with which such trips contact when their corresponding keys are depressed, said trips arranged by such contact to hold their keys depressed, said rotary member provided with means adapted to engage and release said trips and the finger keys controlled thereby.

4. A telegraph transmitter comprising in combination a rotary member provided with a plurality of projections occupying different paths of rotation and distributed angularly, means for driving said member, circuit controlling means operated by said member, finger keys and means operated thereby arranged to engage said projections to arrest said member, trips operated by said finger keys, and stationary means with which such trips may engage when their corresponding keys are depressed, to hold such keys depressed, said trips when so holding their keys being in the paths of projections of said rotary member, and being arranged to be released by the action of such projections.

5. A telegraph transmitter comprising in combination a rotary member provided with a plurality of projections occupying different paths of rotation and distributed angularly, means for driving said member, circuit controlling means operated by said member, finger keys, bell-crank key levers operated thereby, the ends of said bell cranks arranged to engage said projections to arrest said rotary member, spring-actuated trips pivoted to said bell-crank levers, a stationary member upon which said trips normally rest, each trip being arranged to move into engagement with said stationary member when its corresponding key lever is depressed, and when so moved to be in position to be actuated to release its corresponding key lever by a projection of said rotary member.

In testimony whereof I affix my signature, in the presence of two witnesses.

JOHN C. BARCLAY.

Witnesses:
H. M. MARBLE,
T. E. BARTON.